Aug. 22, 1967 W. H. HARPER 3,337,820

SINGLE POLE, MULTITHROW STRIPLINE BEAM SELECTOR SWITCH UTILIZING A PLURALITY OF VARACTOR DIODES

Filed Sept. 7, 1965

2 Sheets-Sheet 1

INVENTOR
WILLIS H. HARPER

BY [signature]

ATTORNEY

Aug. 22, 1967 W. H. HARPER 3,337,820
SINGLE POLE, MULTITHROW STRIPLINE BEAM SELECTOR SWITCH
UTILIZING A PLURALITY OF VARACTOR DIODES
Filed Sept. 7, 1965 2 Sheets-Sheet 2

INVENTOR
WILLIS H. HARPER

BY [signature]

ATTORNEY 3,337,820

SINGLE-POLE, MULTITHROW STRIPLINE BEAM SELECTOR SWITCH UTILIZING A PLURALITY OF VARACTOR DIODES

Willis H. Harper, Oxon Hill, Md., assignor to the United States of America as represented by the Secretary of the Navy Filed Sept. 7, 1965, Ser. No. 485,653
2 Claims. (Cl. 333—7)

The invention described herein may be manufactured and used by or for the Government of the United States of America for governmental purposes without the payment of any royalties thereon or therefor.

The present invention relates generally to an improved selector switch and more particularly to a programmable beam selector switch characterized by low loss and being operable over a broad band frequency range.

The inventive subject matter described herein is directed to a basic concept of the invention, whereas a modified the patentably distinct form of the invention is described in patent application Ser. No. 485,652, filed concurrently herewith.

High-performance fixed-array radar systems have heretofore involved complex and costly components which have served to hinder extensive development and use in this field. Such systems usually included active electronic elements which were frequency operable, and, accordingly subject to errors caused by uncontrollable frequency variations. Further, such components usually included numerous active sub-components thereby adding to the insertion loss caused from the extensive number of hookups required. This invention avoids the above economic and operational disadvantages insofar as providing an economical and positive acting switch.

There is also known in the prior art electronic switching arrangements, sometimes called single pole, multithrow diode switches, wherein a single input source is electronically connected, or disconnected, from the output terminals by a programmed biasing of diodes, one of which is inserted in each of the paralleled conductive paths between the common input and the many output terminals. Satisfactory operation of switching arrangements of this type is difficult to obtain because of matching complexities and because of frequency and efficiency limitations inherent in the parallel connection of large numbers of diode to the single source.

In accordance with the present invention, which seeks to avoid the disadvantages of the prior art devices, there is provided a novel electronic switching arrangement wherein the single input is connected to many output terminals by means of repetitively branching conductive paths. Each of the conductive paths from the common input to the many outputs has a plurality of shunted unidirectional means, or diodes, the programmed biasing of which determines the conductive path of the switch. Problems of matching and broadband efficiency are minimized by limiting to two the number of paths branching from a single preceding path. It is feasible, although not shown in this device, to connect the unidirectional means in series with the conductive paths. The conductive paths are etched on a dielectric member supported between conductive means to form strip transmission lines with the conductive paths.

It is accordingly a primary object of the present invention to provide a switch which is accurately operable over a wide frequency band with a minimum power loss.

Another object of the present invention is to provide a beam selector switch for use in an electronically steered radar system in which phasing is accomplished in passive transmission line components.

It is still a further object of the present invention to provide a single packaged selector switch which is inexpensive and simple to design and reproduce.

With these and other objects in view, as will hereinafter more fully appear, and which will be more particularly pointed out in the appended claims, reference is now made to the following description taken in connection with the accompanying drawings in which:

FIG. 1 of the drawing shows a fragmentary portion of the selector switch. Since only a portion of the entire switch containing one connector port and one diode mount is shown, it should be understood that the rest of the switch is similarly arranged at each port and diode terminal.

Figure 1:
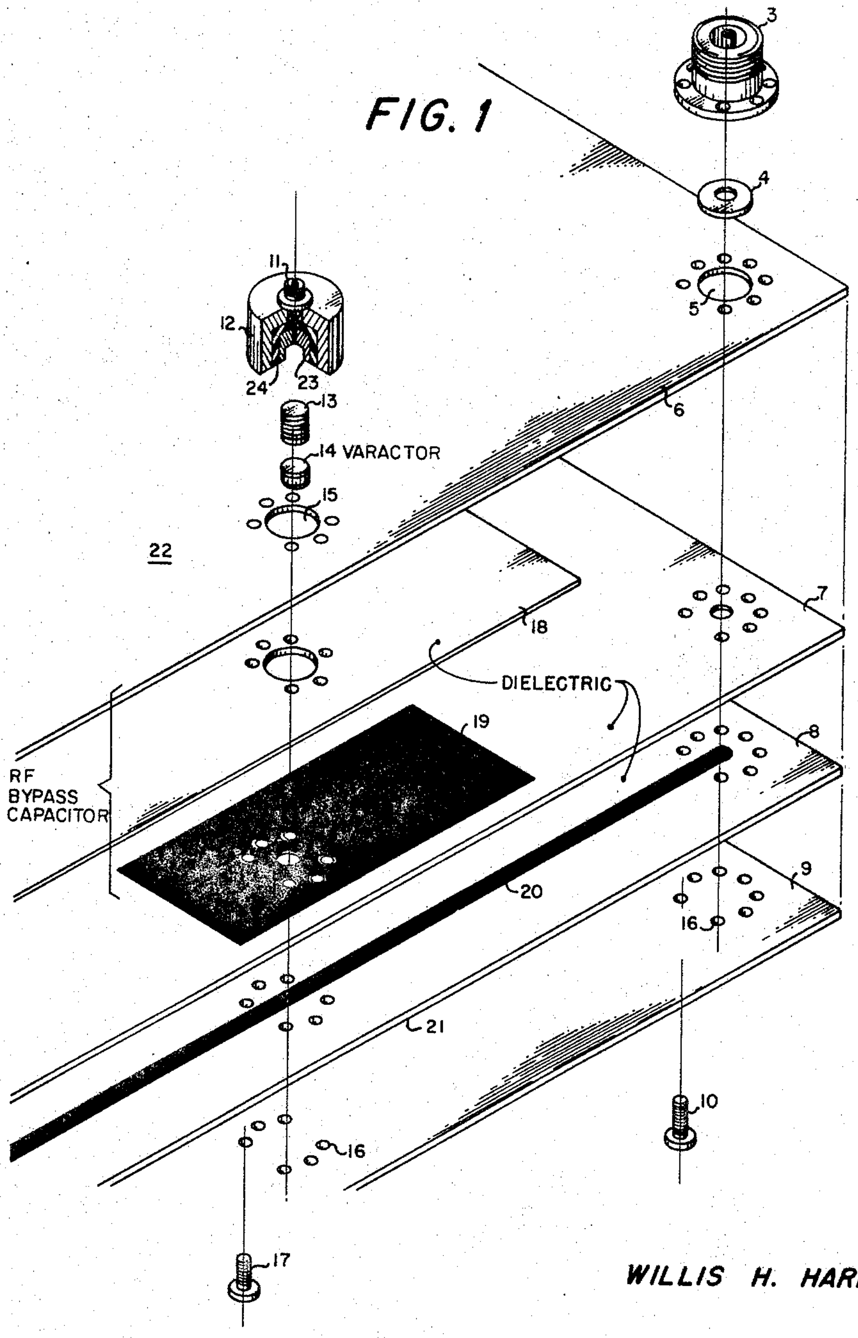

With reference now to FIG. 1 of the drawing, there is shown a standard Type N connector or port 3, although other types may be used, which acts as the transition means from a coaxial line to a strip transmission line, similar type connectors being used at both the input and output terminals of the switch. The connector 3 is mounted on a strip transmission line arrangement, indicated generally as 22. A separating Teflon washer 4 and connector 3, in the assembled condition, pass through connector aperture 5 to conductively engage conductive element 20 of dielectric plate 8.

Strip transmission line 22 is formed in sandwich style with a pair of flat, conductor-carrying, dielectric plates 7 and 8 supported between two flat conductive ground plates 6 and 9. Thus, with the conductors carried by dielectric plates 7 and 8, a basic transmission line is formed having characteristic impedance dependent upon ground-plate spacing, dielectric material constant and thickness and width of the center conductors on dielectrics 7 and 8, as is well known in the transmission line art. Brass plates of 1/16 inch thickness may be used as the ground plates 6 and 9; and Tellite, an irradiated polyolefin with a dielectric constant of 2.35, may be used as the conductor-carrying dielectrics 7 and 8. In more detail, it can be seen from FIG. 1 that the center conductor assembly 7–8 is formed by two respective layers of copper clad Tellite. The top layer of copper clad Tellite, forming the dielectric plate 7, is etched so as to leave a copper by-pass area 19, which with paper thin dielectric 18 and ground plate 6 forms a by-pass capacitor that prevents R-F energy from going into the bias circuit, subsequently to be described. In the device illustrated, the under layer of copper clad on the member 7 has been completely removed to avoid difficulties arising from the effects of mirror images on transmission line carriers. This copper clad could, however, be etched to coincide with the etched copper coating on the lower member 8 discussed hereinafter. Lower stripline member 8 is clad (not illustrated) on its underside with a layer of copper 21 and is etched on the top side to form copper conductor path 20. Where the copper clad is either totally or partially removed from the Tellite, the tendency of the Tellite to warp is counteracted by rigidity of the conductive ground plates 6 and 9. It should also be noted that the copper layer 21 itself may be used to form the ground plate, instead of the separate ground plate 9, if so desired.

To hold the strip transmission line assemblage together a number of threaded areas 16, to receive respective screw members 10 and 17, are provided at spaced intervals along the plate members as shown. Connector 3 and diode case 12 may also be threaded so as to facilitate their mounting to the assemblage.

Referring now to the mounting of the diodes, FIG. 1 shows a typical arrangement. A pill type varactor diode, such as a Sylvania D4421C, is used as the unidirectional conductive means 14 and is electrically contacted on one end by conductive element 20 and on the other end by one end of bellows 13. Bellows 13 is electrically conductive and is housed by an electrically conductive cap 23 which makes contact with both the bellows 13 and by-pass area 19. Bellows 13 also acts to mechanically bias diode 14 in contact with conductive element 20 via aperture 15. An insulation cap 24 prevents electrical contact between diode case 12 (ground) and cap 23, the latter of which is fixedly mounted to transmission line assemblage 22 by screws 17.

The varactor diode 14 may be electrically biased at Microdot connector 11 in accordance with a predetermined program as will be discussed in more detail hereinafter. It is to be understood that the strip transmission line arrangement with connector 3 and varactor diode 14 illustrated in FIG. 1 represent only one of a plurality of similar connectors and diodes which are schematically arranged as described in connection with FIG. 3.

Figures 2, 3:
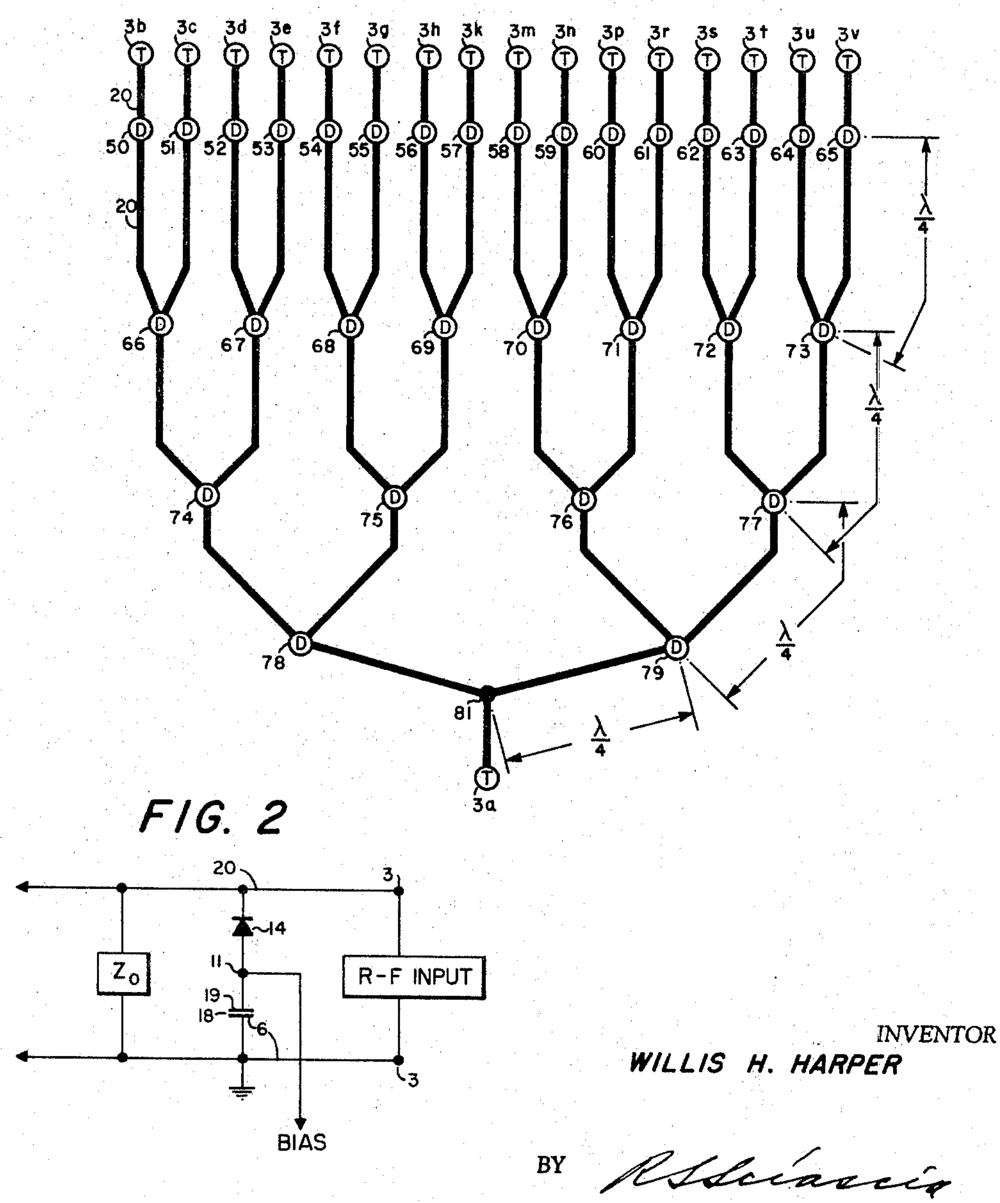
FIG. 2 shows an electrical circuit diagram of the fragmentary portion of the switch shown in FIG. 1.
FIG. 3 shows a schematic arrangement of a transmit-beam selector switch in accordance with the teachings of the present invention.

FIGURE 2 shows an R-F input at terminals 3—3 across the serially connected circuit formed by diode 14 and the capacitor formed by members 6, 18 and 19. The Microdot connector 11 is at the common point between diode 14 and capacitor 6, 18, 19. Also illustrated across the R-F input is a standar transmission line impedance $Z_0$ which represents the impedance seen looking to the next diode-capacitor arrangement in the circuit.

Turning now to FIG. 3, it may be seen that the beam selector switch actually forms a single pole, sixteen-throw microwave switch as illustrated. That is, when energy is directed into the single R-F input *3a* at any given time, one of the sixteen outputs will receive, through one of the repetitively branched conductive paths, a phasing signal representing one position of the switch. Outputs are represented by numerals *3b–3u* and correspond to the N-type connector 3 discussed in connection with FIG. 1. The varactor diodes, which are typically shown in FIG. 1 as reference number 14, are represented by numerals 50–79 and are spaced at intervals along the branched conductive paths a quarter-wave length apart.

To illustrate the operation of the switch, assume a given signal is directed to the input *3a* to be transmitted from output connector *3h* at a given instant of time in accordance with a desired program. At this point, it should be noted that various types of programming devices are well known in the art and are not discussed in detail since such programming forms no part of the instant invention. However, for purposes of this illustration all varactor diodes are assumed to be programmed so as to be forwarded biased during a given instant of time, except 56, 69, 75 and 78 which are reverse biased, thereby simulating an R-F open. When the varactor diodes are forward biased they simulate an R-F short which, when reflected over a one-quarter (¼) wave length path, represents a high impedance as seen by each preceding junction as is well known in the field of transmission lines. Hence, a signal received at input *3a* will see a high impedance looking from point 81 to junction 79 and will accordingly travel to junction 78 where it will again see a high impedance looking from junction 78 to junction 74, and so on. Thus, the desired signal will ultimately be received at output terminal *3h*. Obviously at a different instant of time the bias arrangement will be different in accordance with the bias program and a given signal at input *3a* will be received at a different output terminal, thus resulting in a single pole, multithrow switch.

It is evident that the device may be programed to suit the needs of the particular system it is being used in and is not limited to the operation as described. Although FIG. 2 shows a single-pole, multithrow switch having a particular arrangement of diodes and strip line paths, it is intended to be illustrative rather than limiting since the design of a particular switch is dependent on the needs of the system in which it is used. Further the switch is bilateral since it may be used to receive or transmit R-F energy. The use of the switch of the present invention in a radar system is merely by way of illustration since its use could reduce component installation costs and time in many other areas of the electronic art where programmed selector switches are emloyed.

Obviously many modifications and variations of the present invention are possible in the light of the above teachings. It is therefore to be understood that within the scope of the appended claims the invention may be practiced otherwise than as specifically described.

I claim:

1. A selector switch comprising:

an R-F input connector having input and output sides, a plurality of output connectors, a pair of spaced conductive plates, dielectric supporting means located between said pair of spaced conductive plates, a conductive element etched on said dielectric supporting means and connected to the output side of said input connector, a plurality of output conductive paths etched on said dielectric supporting means, each of said conductive paths being connected to a respective one of said plurality of output connectors, means interconnecting all of said plurality of output conductive paths and said conductive element, said interconnecting means being in the form of intermediate, repetitively branching, conductive paths etched on said dielectric supporting means and characterized in that only two conductive paths branch from a single preceding path and that said repetitive branchings are separated by a length of conductive path equal to a quarter wavelength of the operating R-F frequency applied to said input connector, a plurality of unidirectional conductive means located at said branchings and in each of said plurality of output conductive paths and adapted to be programmably biased in accordance with a predetermined sequence, a plurality of etched areas adjacent said plurality of undirectional conductive means located between one of said pairs of conductive plates and said dielectric supporting means, and a plurality of dielectric layers covering said plurality of etched areas.

2. A selector switch as set forth in claim 1 wherein said plurality of unidirectional conductive means are varactor diodes.

References Cited

UNITED STATES PATENTS

| | | | |
|---|---|---|---|
| 2,959,778 | 11/1960 | Bradley | 333—7 X |
| 3,178,659 | 4/1965 | Smith et al. | 333—7 |
| 3,184,552 | 5/1965 | Macrander | 340—147 |
| 3,223,947 | 12/1965 | Clar | 333—7 |

HERMAN KARL SAALBACH, *Primary Examiner.*

ELI LIEBERMAN, *Examiner.*

P. GENSLER, *Assistant Examiner.*